W. D. KAHN.
PORTABLE ELECTRIC LIGHT.
APPLICATION FILED AUG. 28, 1916.
1,315,556.
Patented Sept. 9, 1919.
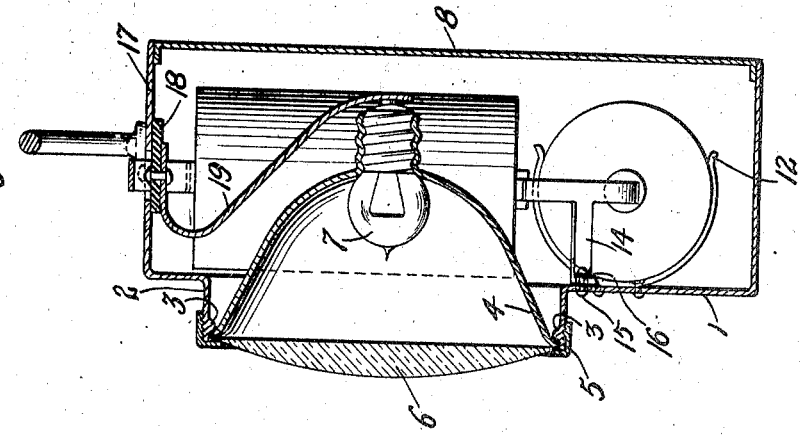
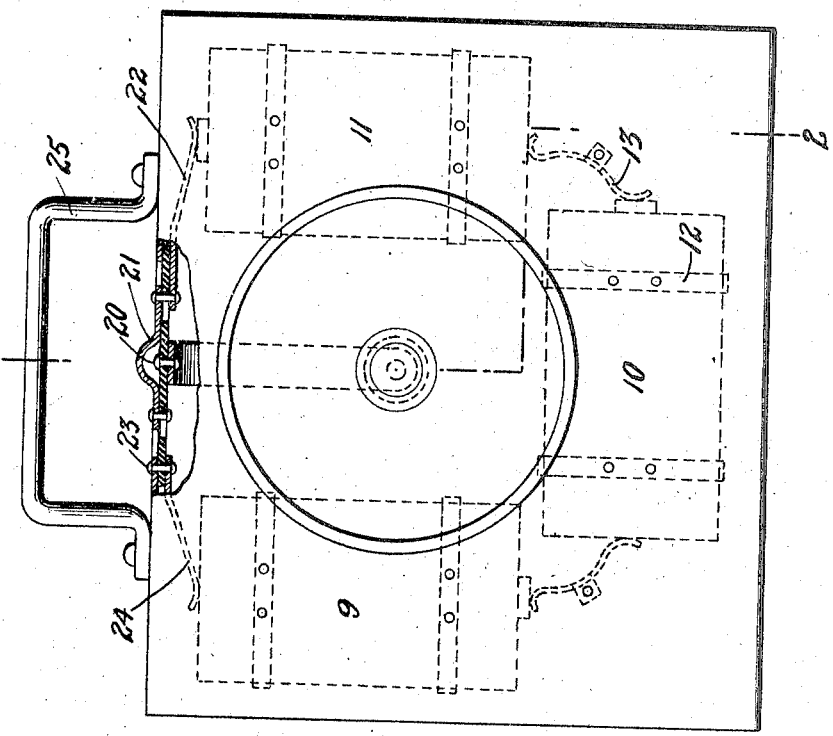
Inventor
Walter D. Kahn
By his Attorneys

UNITED STATES PATENT OFFICE.

WALTER D. KAHN, OF NEW YORK, N. Y., ASSIGNOR TO IMPORT SALES COMPANY, A CORPORATION OF NEW YORK.

PORTABLE ELECTRIC LIGHT.

1,315,556.   Specification of Letters Patent.   Patented Sept. 9, 1919.

Application filed August 28, 1916. Serial No. 117,164.

*To all whom it may concern:*

Be it known that I, WALTER D. KAHN, a citizen of the United States, and a resident of the borough of Manhattan, city, county, and State of New York, have invented certain new and useful Improvements in Portable Electric Lights, of which the following is a specification.

My invention aims to produce a construction of a portable electric light, wherein the cells of the battery are not mounted in contact with one another in the manner common to some portable electric lights, but are separately mounted in order to avoid destruction of the entire battery, due to the leakage of the electrolyte from one cell, and to enable the substitution of one cell for a damaged cell of a battery, without the renewal of the entire battery.

My invention also aims to avoid the use of soldered connections between the various series, so that a cell may be easily removable and replaceable.

In my improved portable electric light I have provided a case, in which single cells interconnected with one another may be used in such a manner that if it is desired to discard any one of the cells of the battery it may be easily removed and a fresh cell substituted therefor without interfering with the other cells of the battery. I also provide a case of the minimum size and of pleasing appearance, and provide means carried by the case for holding the individual cells in position while making them readily removable, and means for electrically connecting said cells into a battery.

My improved portable electric light also provides means for readily inspecting, repairing and adjusting the cells and lamp.

Referring to the drawings accompanying this specification, I have shown at Figure 1 a front view partly in section of my improved portable electric light, and at Fig. 2 a sectional view thereof on the line 2—2 of Fig. 1.

In the drawings I have shown a case, which may be of metal as illustrated, or of any other suitable material, having a fixed front portion 1, which carries a flange 2. Flange 2 is provided with a shoulder 3, upon which reflector 4 rests. Reflector 4 is held in place by means of a collar 5, which is screwed upon flange 2; between reflector 4 and collar 5 is a lens 6. Carried by reflector 4 in the usual manner is a lamp 7.

It will be noted that the reflector 4 carrying the lamp 7 projects back of the general plane of the front portion of one case into the interior thereof, thus making the projection of the reflector beyond the general plane of the case as little as may be desired.

The rear part of the case 8 is made removable in any suitable manner, as by being forced into the case or hinged thereto.

Disposed about the inwardly projecting portion of the reflector are a plurality of single cells 9, 10 and 11, cells 9 and 11 being arranged vertically on either side of the inwardly projecting portion of the reflector, and cell 10 being arranged horizontally, below the inwardly projecting portion of the reflector. Cells 9, 10 and 11 are held in place by spring clips 12 attached to the front portion of the case. The clips 12 need not be insulated from the casing, since the individual cells are usually provided with an insulating cover.

Electrical connection is made between the cells by means of spring contacts 13 supported from the front portion of the case by means of an arm 14 attached to the front of the case by means of rivets or otherwise. In the construction shown in the drawings the arm 14 is attached to the case by means of a rivet 15 passing through an insulating bushing 16. Attached to the top portion 17 of the case is an insulating plate 18 upon which is carried a spring connecting member 19, which is in contact with one of the poles of the lamp 7. A convenient method of attaching the spring contact member 19 is by means of a rivet 20, which projects up through the insulating member 18. Carried upon the insulating member 18 and slidably mounted thereon is a metallic contact member 21, to which is connected a spring contact member 22 adapted to contact with one of the poles of one of the cells.

Spring contact member 22 is electrically connected to the metallic switch member 21, and the case is slotted as shown in Fig. 2, to permit movement of said switch member without contact with the case.

The other pole of the lamp is connected through the reflector to the metallic case, which is also, by means of rivet 23 and spring contact member 24, connected with one pole of one of the cells.

It is evident with such a construction that if the metallic switch member 21 be moved to the left from the position shown in Fig. 1, it will bear against the rivet 20, thus completing the circuit through contact member 19 and the lamp.

I have illustrated the above described switching mechanism as a convenient form for use with a metallic case, but it will be evident to those skilled in the art that the details of the said switching mechanism may be greatly varied and that some of the parts thereof may be dispensed with if a case of insulating material be used.

In the construction illustrated the handle 25, by which the case is lifted, protects the switch member from accidental displacement and injury by being mounted above it. It will also be noted that whenever it is desired to inspect or repair the apparatus it is only necessary to remove the back portion, all of the other apparatus, such as the cells, lamp, reflector, etc., being carried by fixed portions of the case, and thus being by removing the rear portion exposed in their operating positions.

By unscrewing collar 5 lens 6 and reflector 4 may be readily removed and lamp 7 may be easily unscrewed from the reflector for replacement.

While I have shown but one embodiment of my invention, I do not wish to be limited, as it will be evident to those skilled in the art that many changes may be made without departing from the spirit of my invention.

What I claim is:

1. A portable electric light comprising a single case, a plurality of single cells mounted therein out of contact with one another, a plurality of spring clips mounted upon the case and each adapted to support a cell in position, and spring contacts also mounted upon the case and adapted to electrically connect the cells.

2. In a device of the kind described, a single case, a reflector mounted thereon and projecting therein beyond the general plane of the front thereof, a lamp mounted within the reflector, a plurality of single cells spaced from one another surrounding the inwardly projecting portion of the reflector, means mounted in the case for supporting the cells in spaced relation and means mounted in the case for electrically connecting the cells.

3. In a device of the kind described, a single case, a reflector mounted thereon and projecting therein beyond the general plane of the front thereof, a lamp mounted within the reflector, a plurality of spaced single cells separately and individually mounted and surrounding the inwardly projecting portion of the reflector, means for supporting the cells in spaced relation, a switch member connected to the lamp and to the cells and also carried by the case and connections mounted in the case for connecting the cells to each other.

4. In a device of the kind described, a single case having a fixed front portion and a removable back portion, a reflector carried by the front portion, a plurality of separate cells, means carried by the front portion to support said cells individually, and means also carried by the front portion to electrically connect them.

5. In a device of the kind described, a case having a fixed front and top portions and a removable back portion, a reflector carried by the front portion and projecting therethrough into the case, a lamp carried by the reflector, a plurality of single cells mounted within the case about the inwardly projecting portion of the reflector, means for supporting said cells carried by said front portion, means for electrically connecting said cells also carried by the front portion, and means for connecting said cells and lamp carried by the top portion.

6. In a device of the kind described, a metallic case having fixed front and top portions and a removable back portion, a reflector carried by the front portion and electrically connected thereto and projecting therethrough into the case, a plurality of single cells, a plurality of spring clips carried by the front portion and adapted to hold said cells in position, a plurality of spring contacts carried by the front portion and insulated therefrom, a lamp carried by the reflector and switching means carried by said top portion and adapted to connect said lamp with said cells.

7. In a device of the kind described, a metallic case having fixed front and top portions and a removable back portion, a reflector carried by the front portion electrically connected thereto and projecting therethrough into the case, a plurality of single cells disposed about the inwardly projecting portion of the reflector, a plurality of spring clips carried by the front portion and adapted to hold said cells in position, a plurality of spring contacts carried by the front portion and insulated therefrom, a lamp carried by the reflector, a connecting strip carried by the top portion and insulated therefrom and in contact with one of the terminals of the lamp and switching means carried by said top portion and adapted to connect said strip with said cells.

8. In a device of the kind described, a case, a reflector mounted upon the front thereof and projecting therethrough into the case, a pair of single cells vertically mounted on opposite sides of the inwardly projecting portion of the reflector, a third single cell horizontally mounted below said pair of vertically mounted cells, means carried by said case for holding said cells in position, and means also carried by said case for electrically connecting said cells.

WALTER D. KAHN.